(12) United States Patent
Wu

(10) Patent No.: US 7,442,305 B2
(45) Date of Patent: Oct. 28, 2008

(54) DOWNWASH PROCESS BIOREMEDIATION SYSTEM

(75) Inventor: Arthur Cheng-Hsin Wu, Foster City, CA (US)

(73) Assignee: Vitabio, Inc., Foster City, CA (US)

( * ) Notice: Subject to any disclaimer, the term of this patent is extended or adjusted under 35 U.S.C. 154(b) by 91 days.

(21) Appl. No.: 11/505,181

(22) Filed: Aug. 17, 2006

(65) Prior Publication Data

US 2008/0041776 A1    Feb. 21, 2008

(51) Int. Cl.
*C02F 3/00* (2006.01)

(52) U.S. Cl. ............. 210/610; 210/747; 210/170.08; 210/202; 405/128.5; 405/129.25; 435/262.5; 435/281

(58) Field of Classification Search ............ 210/170.08, 210/209, 610, 747, 202, 194; 405/128.45, 405/128.5, 128.7, 128.75, 129.2, 129.25; 435/262.5, 262, 281
See application file for complete search history.

(56) References Cited

U.S. PATENT DOCUMENTS

| | | | |
|---|---|---|---|
| 4,401,569 A * | 8/1983 | Jhaveri et al. ............ 405/128.5 |
| 4,600,508 A * | 7/1986 | DeGhetto ............... 210/170.07 |
| 4,830,755 A * | 5/1989 | Hardin ................... 210/170.07 |
| 4,992,174 A * | 2/1991 | Caplan et al. ........... 210/170.07 |
| 5,100,455 A * | 3/1992 | Pinckard et al. ............. 210/690 |
| 5,322,629 A * | 6/1994 | Stewart ................... 210/170.03 |
| 5,830,752 A * | 11/1998 | Bruso ..................... 405/128.55 |
| 6,207,056 B1 * | 3/2001 | Lucido et al. ............... 210/610 |
| 6,679,992 B1 * | 1/2004 | Kitagawa et al. ........ 210/170.07 |
| 6,921,477 B2 * | 7/2005 | Wilhelm ................ 210/170.07 |
| 7,204,660 B2 * | 4/2007 | Shulgin et al. .......... 405/128.75 |
| 2004/0229342 A1 * | 11/2004 | Lunde et al. ................. 435/262 |
| 2006/0166348 A1 * | 7/2006 | Gerritse et al. ........... 435/262.5 |

* cited by examiner

*Primary Examiner*—Christopher Upton

(57) ABSTRACT

Disclosed herein is a method for the removal of petroleum hydrocarbon and toxic constitutes from contaminated soils and sediment. The method comprises the removal of contaminated materials from soils and performs bioremediation for the removed contaminated materials in an efficient mode. The remained contaminated materials in the soils are biologically stabilized to allow microorganisms to grow and to consume the remained contaminated materials in the soils.

7 Claims, 1 Drawing Sheet

DOWNWASH PROCESS BIOREMEDIATION SYSTEM

FIELD OF INVENTION INVENTION

This invention related generally to processes and systems for use in the treatment of hazardous contaminated soils, and more specifically related to a bioremediation method and system for use in the treatment of hazardous contaminated soils.

BACKGROUND OF INVENTION

The present invention is directed to the treatment of oily contaminated soils, and in particular to bioremediation of oily materials to meet environmentally remediation objectives. As such, the present invention is directed to the treatment of compositions with high petroleum hydrocarbon concentrations, chemically oily based materials or toxic substitutes, examples of which are crude oil or chemical oil storage tank leakage, gasoline station underground storage tank leakage, the underground gasoline pipes leakage, oily soil, oily sludge, chemical sludge, the spills of oily materials on the surface and gradually diffused and deposited in the underground, etc.

Economic and environmental consideration indicates that bioremediation on site offer a significant potential for the remediation and treatment of waste and waste contaminated materials. It maybe note that areas contaminated with hazardous wastes are usually very large, and maybe irregular, requiring the treatment of large amount of solids to meet remediation objectives.

The use of ultimate disposal technologies such as incineration, chemical fixation results in very large expenditures of capital, in addition to the costs associated with the digging out, handling and transporting of these materials to a facility for treatment. Biodegradation methods at site provides a lower cost relative to most other approaches because they are conducted onsite and use less complicated equipment. Furthermore, they can be conducted using a combination of above ground and in situ treatment for a total treatment approach.

One of the common approaches is to use vacuum pumps, or blowers to suck out the contaminated materials in the underground. Apply vacuum blowers to remove the gas phase of oily materials, and spray microorganisms into soil for treating the remained hydrocarbon materials. This approach is energy intensive due to continuously operating vacuum blowers require large amount of electricity, and the result generally cannot meet the remediation objectives.

In situ bioremediation is another way to approach by introducing the mixture of microorganisms into the contaminated field. This approach requires microorganisms to decompose the waste materials through metabolism, the toxic constitutes in the contaminated area are converted into non-toxic constituents or their concentration is reduced such that they no longer pose a threat to the human health and environment. The remediation requires continuous operation and the period of in situ treatment for the site requires years to finish.

One fundamental concern is that the indigenous or cultured microorganisms have no any incentive in that contaminated environment to convert the targeted toxic materials in the soils. The waiting period for the microorganisms to decompose the toxic constitutes is difficult to estimate by field environmental engineers and the remediation result is mixed. For a large field operation, the uncertainty of well-treated and poor-treated fields mixed together can make the on-going field treatment more difficult to proceed.

In the industrial and commercial application, there is a need to have an efficient bioremediation system to take care various types of toxic constitute from contaminated soils. For this reason, there remains substantial room for improvement in the field.

SUMMARY OF THE INVENTION

The present invention relates to a remediation process that is capable of removing major portion of the toxic constitutes from soils; improving the effectiveness of bioremediation for the remained toxic constitutes in the soils; decomposing the removed toxic constitutes in the preferred embodiment; and shortening the on site treatment waiting period.

It is an object of the present invention to provide a bioremediation system, which is capable to treating a wide variety of toxic constitutes in soils, particularly for petroleum based hydrocarbon materials.

It is another object of the present invention to reduce the bioremediation waiting period for cutting down the operation cost during on site field operation.

It is further object of the preferred embodiment to provide a remediation system in which the on site operation is efficient, reliable and trouble free, while also meeting the remediation objectives.

Additionally in accordance with a preferred embodiment of the present invention, the method further comprises the step of adding a bio stabilizer.

Still further in accordance with a preferred embodiment of the present invention, the fertilizer materials such as nitrogen fertilizer, amino acid or NPK mixed types fertilizers are added to improve the effectiveness of the bio stabilizer.

These and other objects and advantages of the present invention will become clear to those skilled in the art upon review of the following specification, the accompanying drawings and the appended claims.

DETAILED DESCRIPTION OF THE PREFERRED EMBODIMENTS

Figure 1:
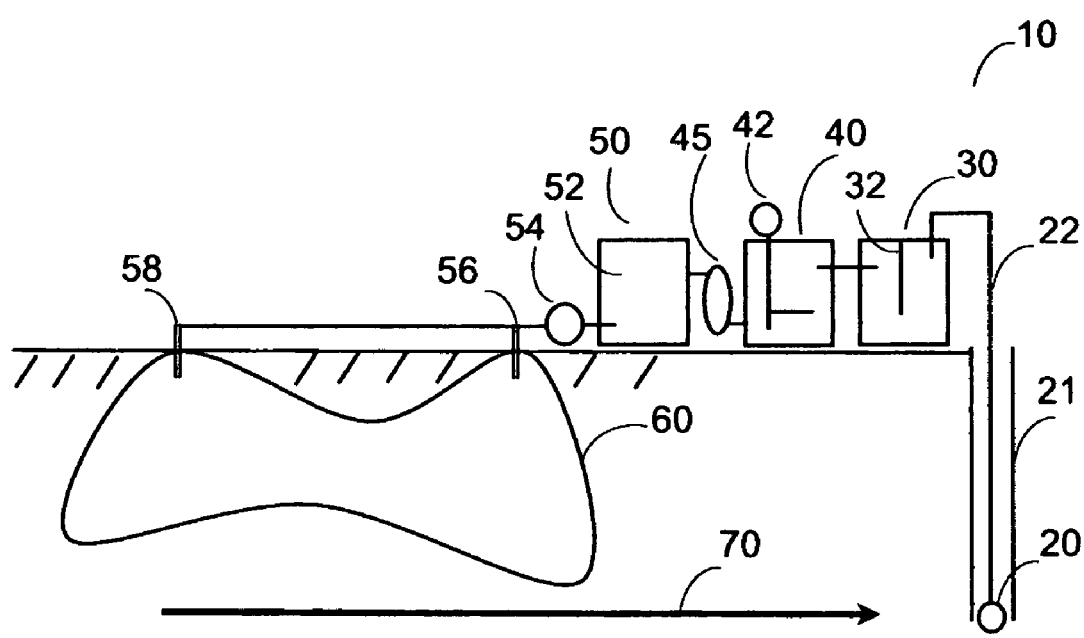
FIG. 1 is an overall diagrammatical view of a downwash process bioremediation system according to the present invention.

A preferred embodiment of the downwash process bioremediation system is illustrated in a schematic diagram in FIG. 1 and is referred to by the general reference character 10. In this illustration it may be seen that the downwash process bioremediation system 10 is adapted to receive inflow of wastewater from a submerge pump 20. This submerge pump 20 can also be equipped with low-height control. When the water level in the well 21 reaches a certain high level, the submerge pump 20 is automatically on to pump out the wastewater. When the water level drops to a preset low level, the submerge pump is automatically off. The mixed water flows through the connecting pipeline 22 and enters into the sediment tank 30.

One of the major functions of the sediment tank 30 is to perform solid and liquid separation. The sediment tank 30 has at least two compartments. The solid portion that includes the sand, dust, and small stones are stayed in the bottom of the first compartment of sediment tank 30, and the liquid portion of wastewater goes above through the partition divider 32 and flows in the next compartment of sediment tank 30.

The bioremediation tank 40 receives the initial treated wastewater from the sediment tank 30. The wastewater contains water, petroleum hydrocarbon, and other chemical materials. An aeration pump 42 is used to deliver air into water through a perforated device 44 with fine holes on the surface. So the size of air bobbles is small and can be distributed throughout the bioremediation tank 40.

The operator initially can add in local indigenous or cultured microorganisms into the bioremediation tank 40. The aeration pump 42 can operate into different modes. One of them is to maintain the aeration pump 42 on constantly, and this enables the bioremediation tank 40 stays in the aerobic operation. The other preferred mode is to turn on and off the aeration pump 42 periodically. The sequential on and off operation of the aeration pump 42 can alter the activities of microorganisms in the bioremediation tank 40.

Aerobic operation means the microbial activities depending on the supply of oxygen. The more oxygen supply, the more oxidization process will happen in the bioremediation rank 40. Anaerobic operation means the microbial activities under lack of oxygen environment. During anaerobic operation, microbes are forced to take in toxic constitutes into cell in order to gain nutrient and energy. This anaerobic operation is useful to break down the long-chain hydrocarbon materials especially those with nitrogen chemical chain in the toxic constitutes.

By controlling the operation time period of the aeration pump 42, the operator can change the aerobic and anaerobic status in the bioremediation tank 40 assuming most of the microorganisms are facultative-type microorganisms. To illustrate this further, assuming the aeration pump 42 is on for about forty-five minutes per hour period to maintain the bioremediation tank 40 into aerobic operation, and then switch off the aeration pump 42 for fifteen minutes. The dissolved oxygen will be depleted quickly, probably within three to five minutes. Once the oxygen is gone, the microorganisms in the bioremediation tank 40 are forced to turn into anaerobic operation by taking in any nutrient that they can receive in the mixed water.

The wastewater in the bioremediation tank 40 is forced to flow through the oily-absorption media filter 46 to remove any remained oily materials in the wastewater and to enter into the mixing tank 50 for further mixing treatment.

Once the treated wastewater enters into the mixing tank 50, the water contains no more oily-based materials. The operator adds a suitable amount of bio-stabilizer 52 into the mixing tank 50 and mixes it with water properly.

The water mixed with the bio-stabilizer materials 52 becomes the mixture of mixed water and is pressurized through the water pump 54 to flow into the remediation field. The remediation field is divided into a number of small cells for treatment purpose. For illustration purpose, FIG. 1 shows the mixed water flows into injection point 56 and injection point 58, and enters into the soils with corresponding cell.

One component of the process that is significant is the selection of the bio-stabilizer materials 52. One of the preferred selections of bio-stabilizer materials 52 is humus substance. Humus substance has a long chain molecular structure with heavy molecular weight and is from the exploration of Lignite materials.

The pressurized mixed water continues to wash down through the soils, and within the downwash process, there are several reactions happened concurrently. The light hydrocarbon materials are removed from the surfaces of soil particles by downwash physical force, and are washed away. Some of the bio-stabilizer materials 52 are absorbed by the soils, and this absorption can cause the saturation of electric charge of soil and to release the petroleum hydrocarbon that was attached on the soil surface. This is particularly useful for those soils containing high minerals such as calcium and iron and show large amount of electric charge. Some of the bio-stabilizer materials 52 are deposited on the soil surface and are interlinked or mixed with petroleum hydrocarbon materials. The deposited bio-stabilizer on the surface of soil particles may stay there for a period of time, or may be released from the soil by the downwash force. By doing so, the particles of bio-stabilizer releasing from soil surface can also carry the petroleum hydrocarbon.

The mixed water in the soils continues to downwash and becomes wastewater through the contaminated region 60 as illustrated in FIG. 1. It eventually either reaches the underground flow or reaches the hard rock bed to form a water flow by itself, and continuously flows into down stream 70 as indicated in FIG. 1.

The submerge pump 20 in the well is ready to pick up more wastewater when the water level reaches a certain high level. The wastewater is flowing into the sediment tank 30 and the whole operation process indicated above is repeating.

As will be understood by those skilled in the art, various modifications and alterations of the specific structure described above as constituting the preferred embodiment may be utilized with acceptable results. For example, the specific structures of the tanks, pumps, pipes described above may be modified substantially while still retaining the primary functional characteristics and providing results which are improved over those of the prior art. The well 21 described above may be modified as a collecting pond to collect more wastewater. Certainly, the dimensions of all equipment may also be modified, particularly depending upon the specific purpose for which the downwash process bioremediation system 10 is intended to be used.

The selection of bio-stabilizer materials 52 shows the field dependent characteristics. It needs to mix humus substance of fine grain size, intermediate grain size and coarse grain size. The fine grain size of humus substance can dissolve into water immediately. The intermediate grain size of humus substance needs to take several weeks to dissolve in water, and the coarse grain size of humus substance needs to take a longer time to dissolve in water.

The soils in the contaminated region 60 my have sand-type soil, clay-type soil, or other mixed type soil. During the downwash operation, initially the top portion of the contaminated region 60 reaches the saturated stage with high concentration of the bio-stabilizer materials 52, and then gradually diffuses down word by following gravity direction and downwash physical force. Major portion of petroleum hydrocarbon materials are released from soils due to the soil electric charge are saturated and loose the capability to hold the petroleum hydrocarbon materials. Further supply of pressurized mixed water with bio-stabilizer materials 52 moves the concentrated mixture down flow and eventually reaches the down stream 70.

The remained petroleum hydrocarbon materials or other toxic substitutes in the soils are covered with bio-stabilizer materials 52. This can provide a nutrition rich environment for microorganisms to grow. The microorganisms can come from local indigenous microorganisms or cultured microorganisms supplied by the field operators. The filed operators can add cultured microorganisms into mixing tank 50, or into injection point 56 and 58, or directly spraying on the field. During the microorganisms growing and populating period, the microorganisms use bio stabilizer materials 52 as a major food source to multiply their population in the soils.

Without mixing with bio stabilizer materials 52, the microorganisms have no any incentive to digest petroleum hydrocarbon or toxic substitutes because those toxic substitutes can pose a threat to human health also can harm microorganisms, and the microorganisms have intention to move away from toxic substitutes based on the natural instinct. With the benefit of bio stabilizer materials 52 to biologically stable the toxic substitutes, the microorganisms view whole field as a growing field and can consume or convert petroleum hydrocarbon or toxic substitutes that mixed with bio stabilizer materials 52.

The field operators also can supply air through the injection point 56 and injection point 58 to increase oxygen content in the soils.

For certain area of field operation, adding humus substance as the bio stabilizer materials 52 in the mixing tank 50 at the initial circulation operation. When the concentration of humus substance in soils is gradually accumulating, adding fertilizer such as nitrogen fertilizer, amino acid fertilizer or nitrogen, phosphate, and potassium mixed type fertilizer to boost up the population of microorganisms in the soils. The nutrient-rich environment encourages the blooming of microorganisms. When microorganisms consume the available food sources, microorganisms also decompose the contaminated materials or toxic substitutes mixed in there. The microorganisms may decompose the toxic substitutes partially and can enhance the release of toxic substitutes from soils in the downwash process.

One of the advantages of the present invention 10 is the efficiency to remove the petroleum hydrocarbon materials or toxic substitutes from the soils. The downwash process removes the contaminated materials from soils and performs the bioremediation operation in the bioremediation tank 40. The structures such as sediment tank 30, bioremediation tank 40, aeration pump 42, oily-absorption media filter 46, mixing tank 50, water pump 54, etc., can be loaded on a special trailer to increase field mobility.

Some contaminated fields have very deep underground floor beds that are not practically feasible to reach. A preferred alternative is to dig out the contaminated soils and to load it on the container. The container links the piping with the trailer that mentioned above to perform the downwash bioremediation operation in the container. After the soils meet the remediation objectives, the treated soils can be returned back to the fields.

Those skilled in the art will readily recognize that numerous other modifications and alterations of the specific structures, dimensions, materials and components may be made without departing from the spirit and scope of the invention. Accordingly, the above disclosure is not to be considered as limiting and the appended claims are to be interpreted as encompassing the entire scope of the invention.

INDUSTRIAL APPLICABILITY

The downwash process bioremediation system 10 according to the present invention is adapted to be utilized in a wide variety of industrial and field applications wherein it is desired to convert petroleum hydrocarbon materials and toxic substitutes into non-harmful by products. The system 10 is adapted particularly for soil contamination cleanup.

The following uses one field operation example to illustrate the advantages in actual field operation. A roadside field was contaminated by gasoline spill due to a gasoline pipeline leakage, the gasoline materials floating on the roadside surface were recovered and major portion of gasoline materials were diffused into the soils and penetrated into underground. The contaminated field area was about fifty meters times fifty meters, and the depth of contamination soils ranged from 1 meter deep to 3 meters deep. The estimated total gasoline leakage in this accident was about 10,000 to 50,000 liters. The rock bed is located around 3.5 meters below ground. The TPH (total Petroleum Hydrocarbon) from inspection wells ranged from 2000 ppm to 10000 ppm.

This roadside contaminated field applied the methodology of downwash process bioremediation system 10 described above. At the underground floor bed downstream direction, dug out a collecting pond to collect the released oily materials. Submerge pump 20 moved the oily materials with water and dirt into sediment tank 30. The oily materials and water flew into bioremediation tank 40 in which the aerobic and anaerobic operation was set in sequence to decompose the oily materials. The treated water passed through oily-absorption media filter 46 and entered into the mixing tank 50. Proper amount of bio stabilizer materials 52 was added to mix with treated water to become a mixed solution. The water pump 54 delivered pressurized mixed water to several injection points on the field.

The pressure of water pump 54 was maintained in a range of 5 to 10 kg of pressure. The first injection operation started from the most upstream injection point on the field respect to the position of downstream collecting pond. The injection operation followed in sequence to move to the downstream direction. After completion of first cycle injection operation, repeated the injection operation cycle until the mixed water at the collecting pond showed no more oily material.

The microorganisms kept populating in the region that containing humus substance. On the roadside surface, the algae and weed grew very fast. After three and half months of actual field remediation, the TPH at several inspection wells ranged from closed to 0 ppm to less than 100 ppm, and the results can meet the local environmental requirements.

In light of the many efficiencies and advantages of the downwash process bioremediation system 10 of the present invention, it is expected to appeal to a great number of potential users. Efficiency of operation, minimum down time for cleaning, substantial automated, and humus substance of the bio stabilizer materials 54 provides advantages that make the remediation operation efficient. Comparing with traditional underground soil bioremediation operation that usually requires one to two years, even three years to decompose the contaminated materials in the field. Accordingly, it is expected that the downwash process bioremediation system 10 according to the present invention will have industrial applicability and environmental utility which are both wide spread and long lasting.

The invention claimed is:

1. A bioremediation system, comprising:
   a pump for receiving wastewater from soil;
   an aeration device for decomposing hydrocarbon materials from said wastewater received from output of said pump;
   an oily absorption media filter for removing oily portion of said hydrocarbon materials from said wastewater received from output of said aeration device;
   a mixing device for adding a bio stabilizer material into said wastewater received from output of said oily absorption media filter to become mixed water;
   a water pump for delivering said mixed water into said soil, removing a portion of said hydrocarbon materials from said soil and generating said wastewater to be received by input of said pump;
   wherein said bio stabilizer material comprises humus substance.

2. The bioremediation system of claim 1 wherein said bio stabilizer material further comprises at least a source of one of the following fertilizers:
   (a) a nitrogen fertilizer,
   (b) an amino acid fertilizer, and
   (c) a nitrogen, phosphate, and potassium mixed type fertilizer.

3. The bioremediation system of claim 1 wherein said hydrocarbon materials include a source of petroleum hydrocarbon.

4. The bioremediation system of claim 1 wherein said aeration device can operate in an aerobic mode or in a mixed aerobic and anaerobic mode by a means for controlling an air supply from said aeration device.

5. A downwash bioremediation system, comprising:
   a pump for pumping wastewater from soil into a receiving tank;
   said receiving tank for collecting said wastewater and depositing solid portion of said wastewater into said receiving tank;
   an aeration tank for receiving output from said receiving tank, said aeration tank using an aeration device for aerobic and anaerobic operations wherein microorganisms are added to said aeration tank for decomposing hydrocarbon materials contained in said aeration tank;
   an oily absorption filter receiving output from said aeration tank for removing oily portion of said hydrocarbon materials;
   a blending tank for receiving output from said oily absorption filter, said blending tank using a blending device for mixing humus and said output from said oily absorption filter to form mixed water;
   a pressurized means for delivering said mixed water into said soil,
   wherein said mixed water washes said soil by removing said hydrocarbon materials in said soil to form said wastewater, and said microorganisms consume said hydrocarbon materials blended with said humus in said soil.

6. The downwash bioremediation system of claim 5 further comprising:
   a source for adding a chemical fertilizer into said blending tank.

7. A pressurized downwash bioremediation process, comprising:
   (a) delivering pressurized mixed water into soil;
   (b) treating said soil by pressurized washing and saturating electric charge of said soil by said mixed water to release hydrocarbon materials;
   (c) combining down stream of said mixed water, said hydrocarbon materials and portion of said soil to form wastewater;
   (d) collecting said wastewater from underground soil;
   (e) separating solid portion of said wastewater by sedimentation;
   (f) decomposing said hydrocarbon materials within said wastewater by aerobic and anaerobic operations and adding microorganisms;
   (g) removing oily portion of said wastewater to form water;
   (h) mixing said water with humus substance, and mixed type of nitrogen, phosphate, and potassium fertilizer to form said mixed water.

* * * * *